Patented Aug. 3, 1937

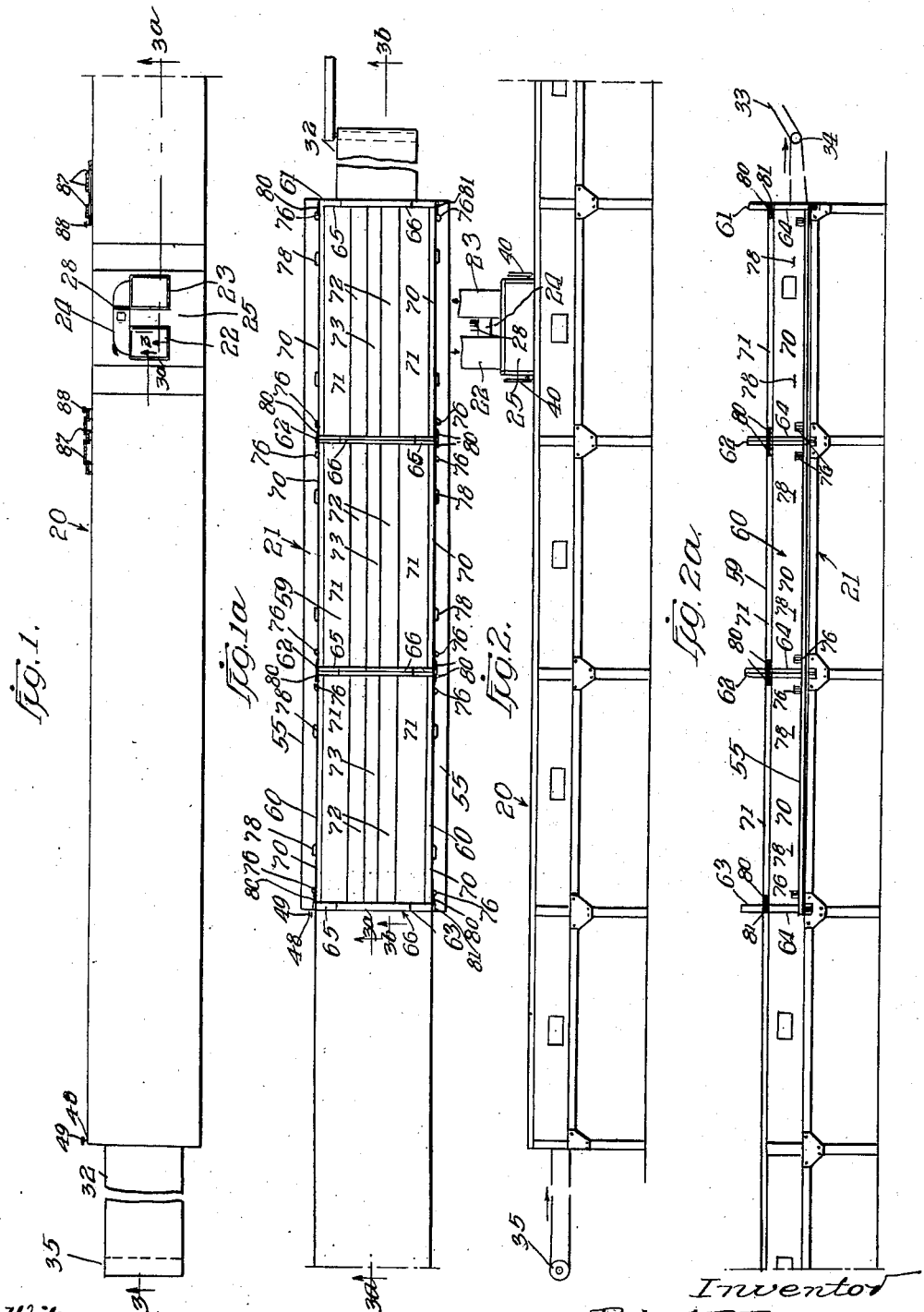
Aug. 3, 1937.  R. P. RASMUSSEN  2,088,610
MEANS FOR COOLING AND PACKING FOOD PRODUCTS
Filed June 13, 1932   8 Sheets-Sheet 1
Inventor
Robert P. Rasmussen
By Edward Fay Wilson
Atty Aug. 3, 1937.　　　　R. P. RASMUSSEN　　　　2,088,610
MEANS FOR COOLING AND PACKING FOOD PRODUCTS
Filed June 13, 1932　　　8 Sheets-Sheet 2
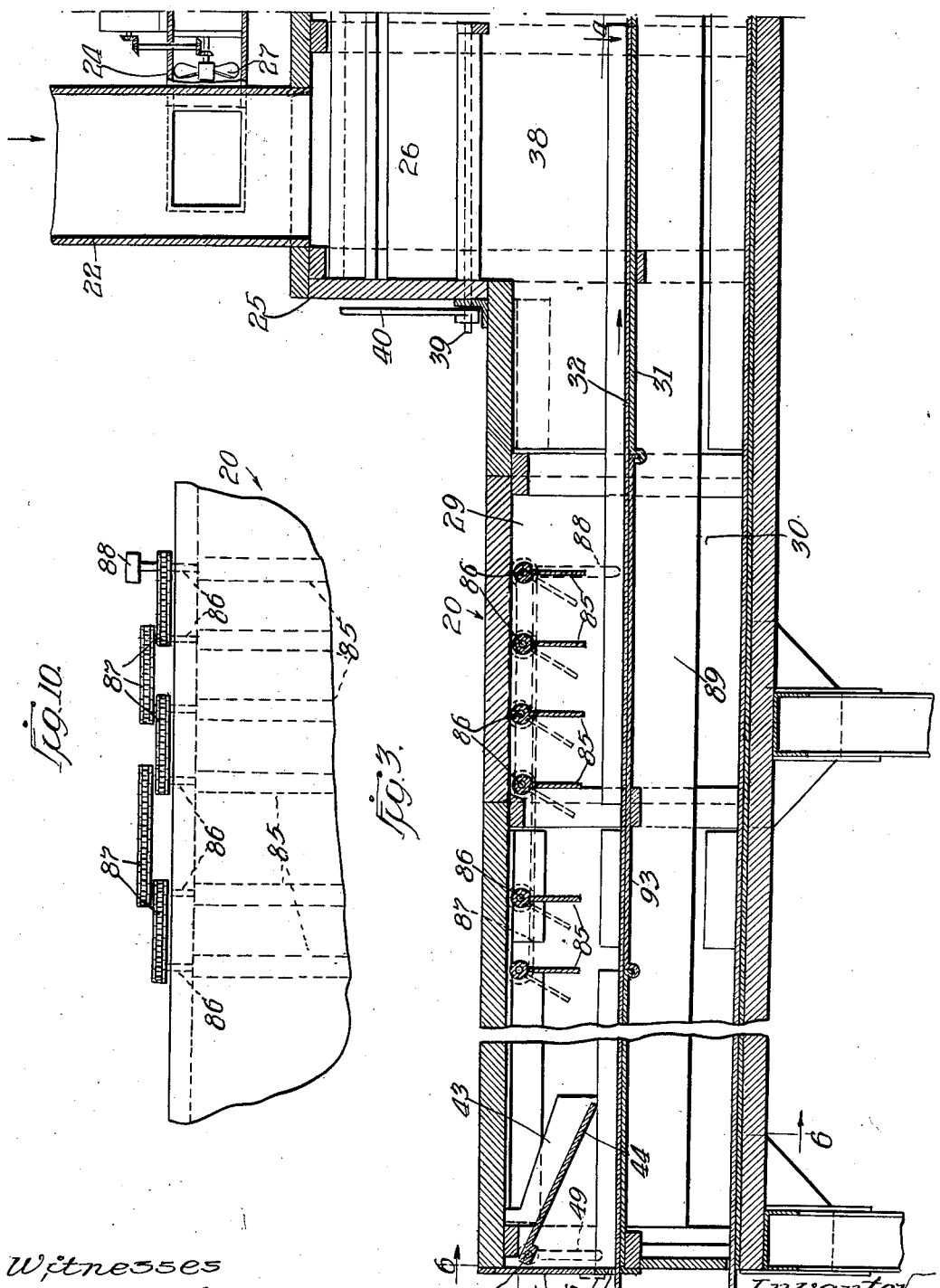

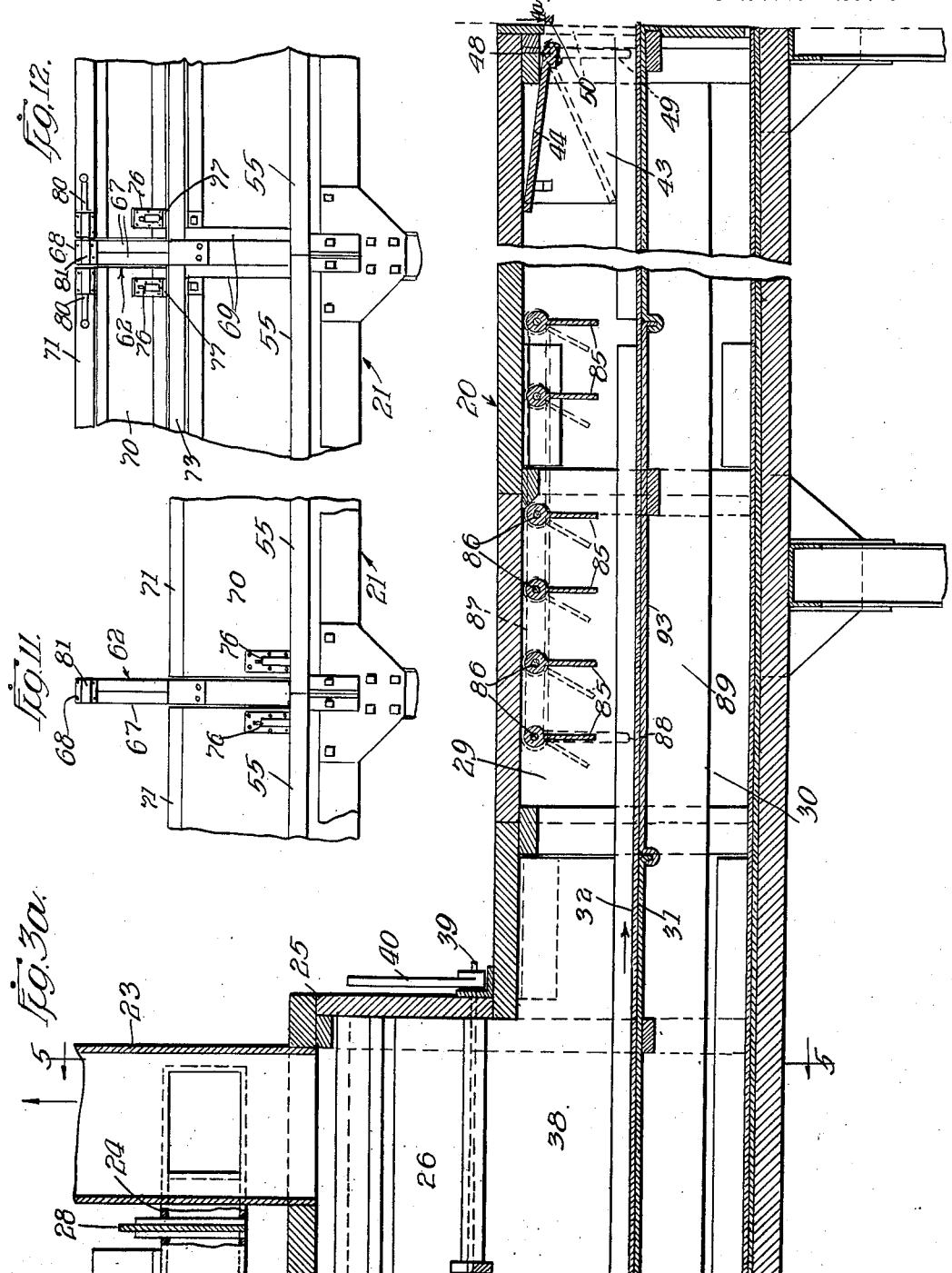

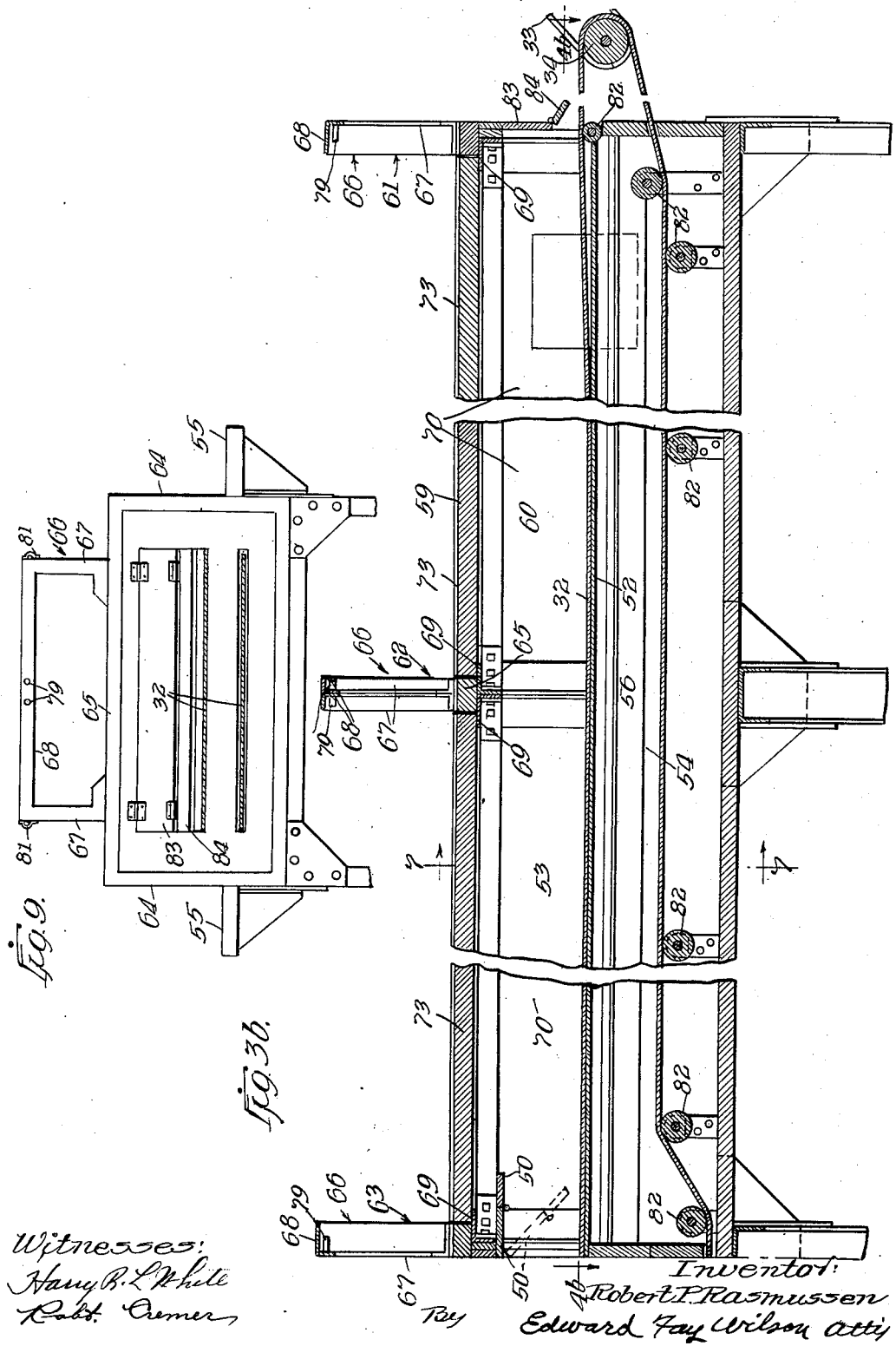

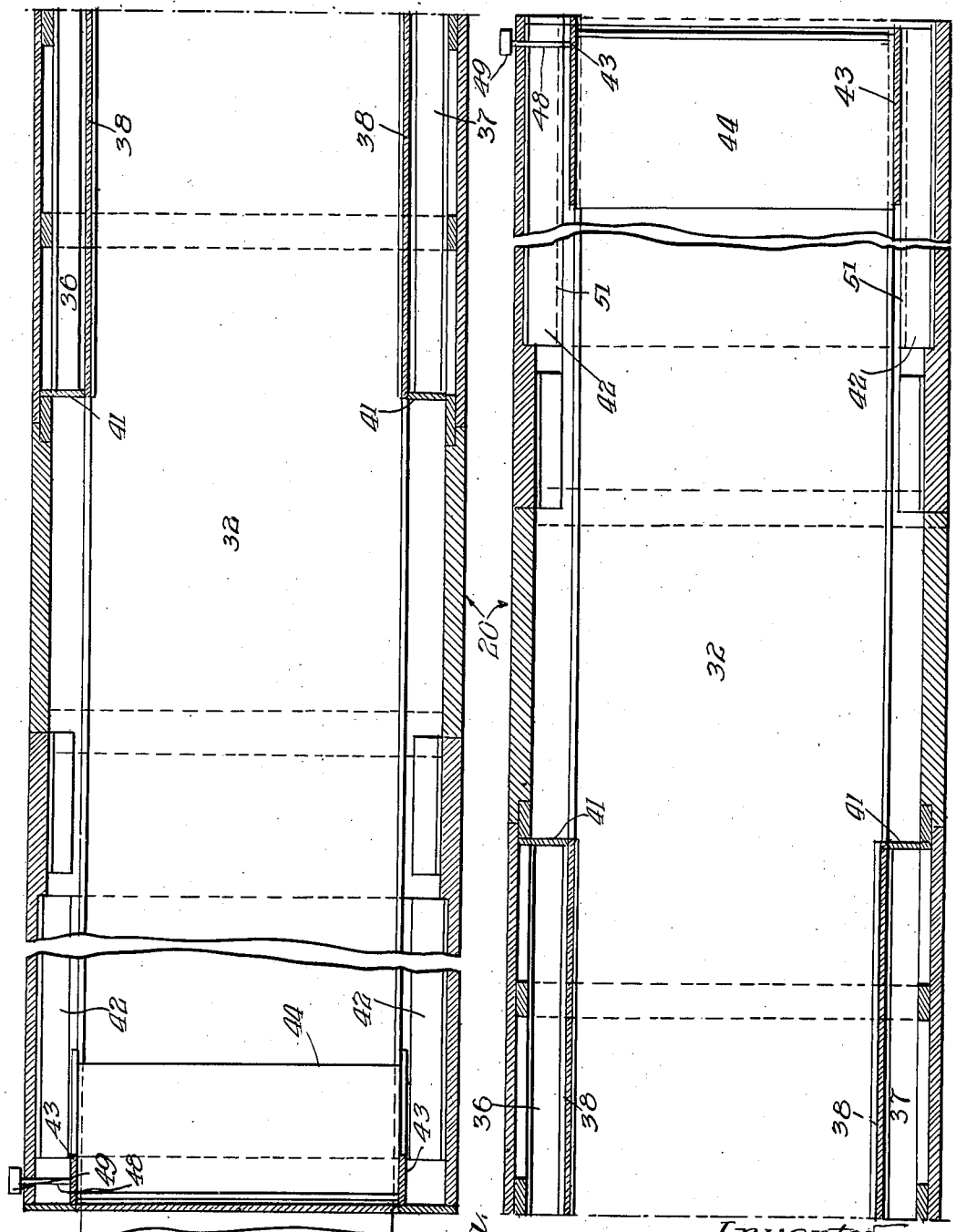

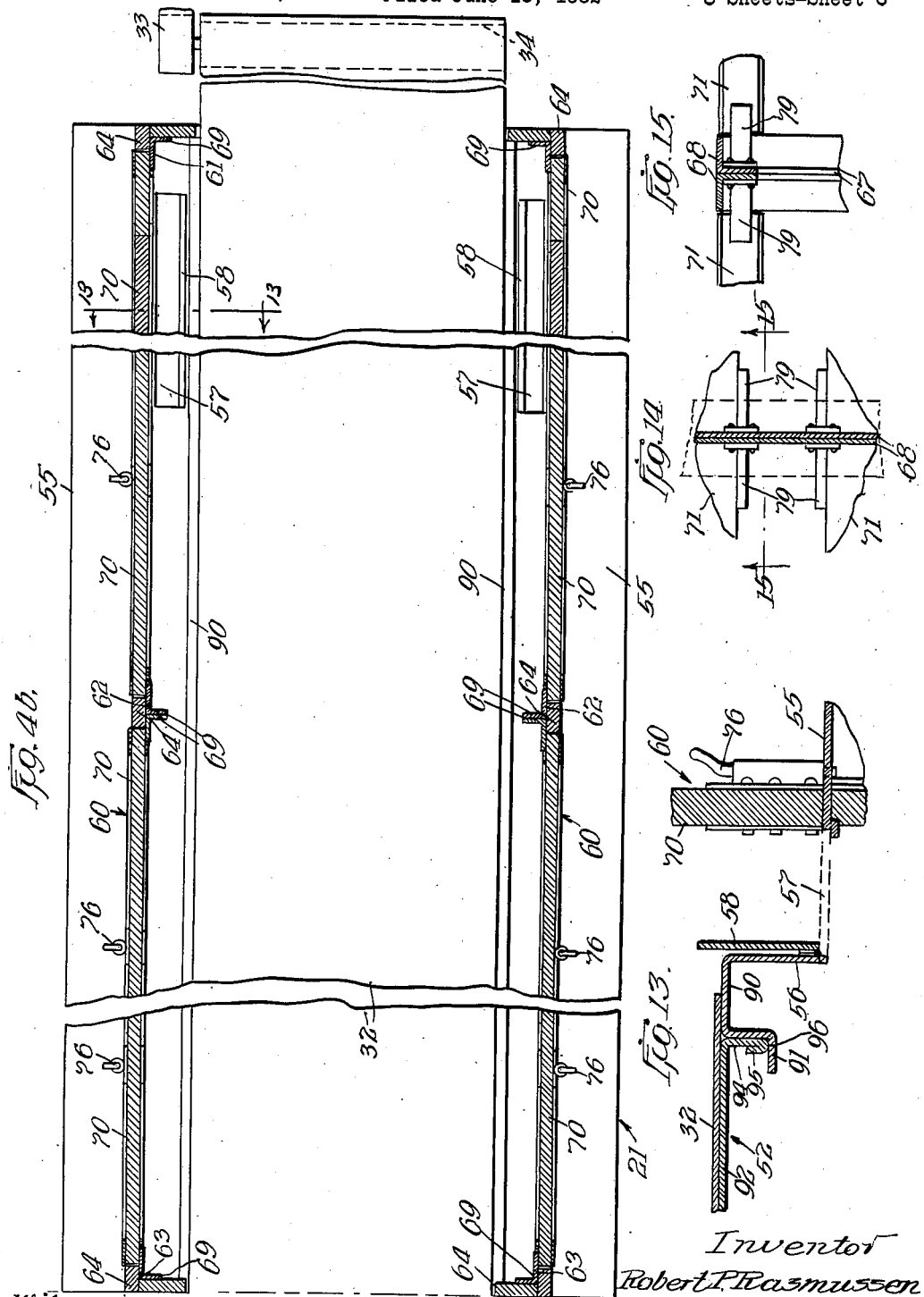

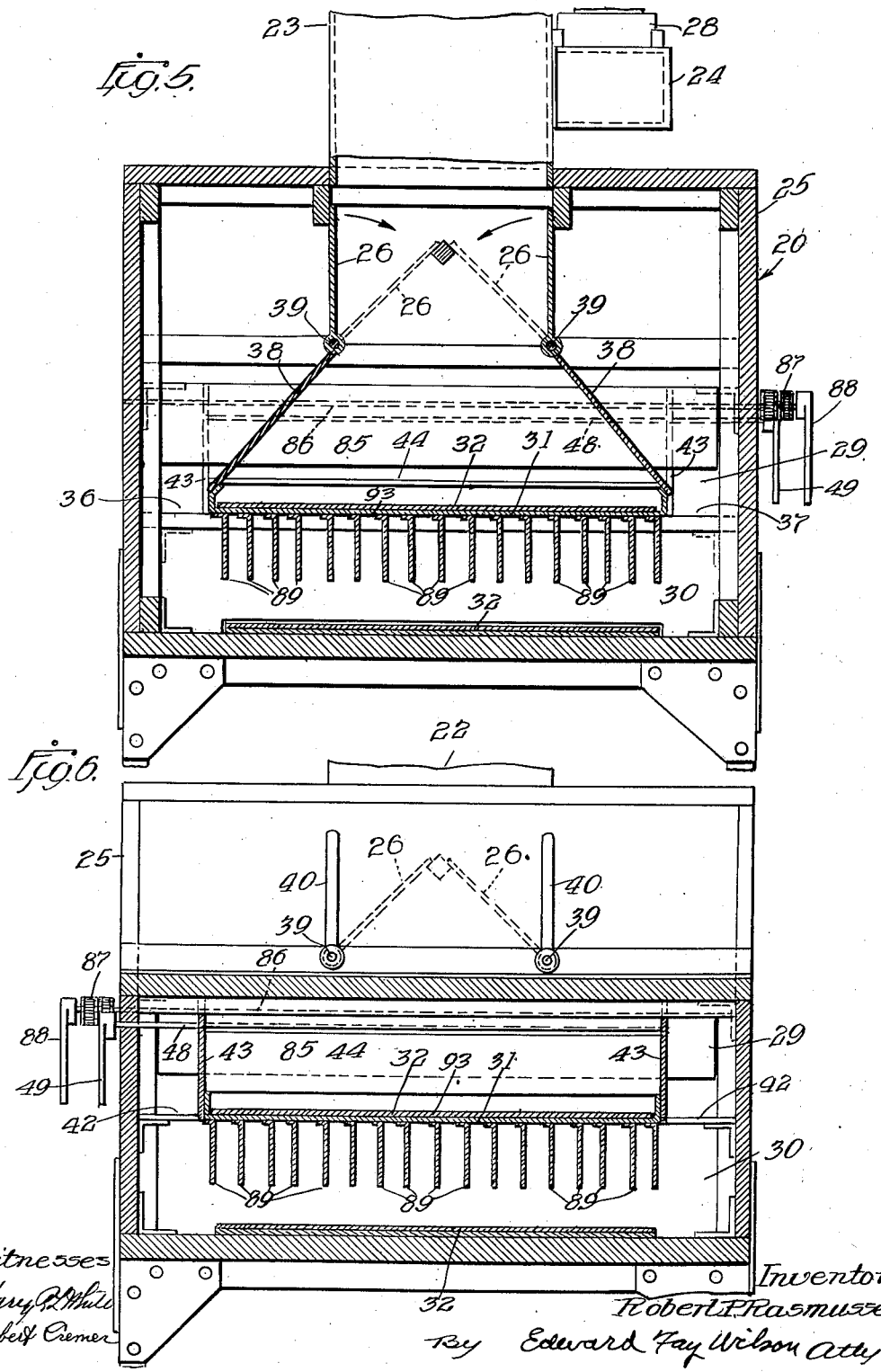

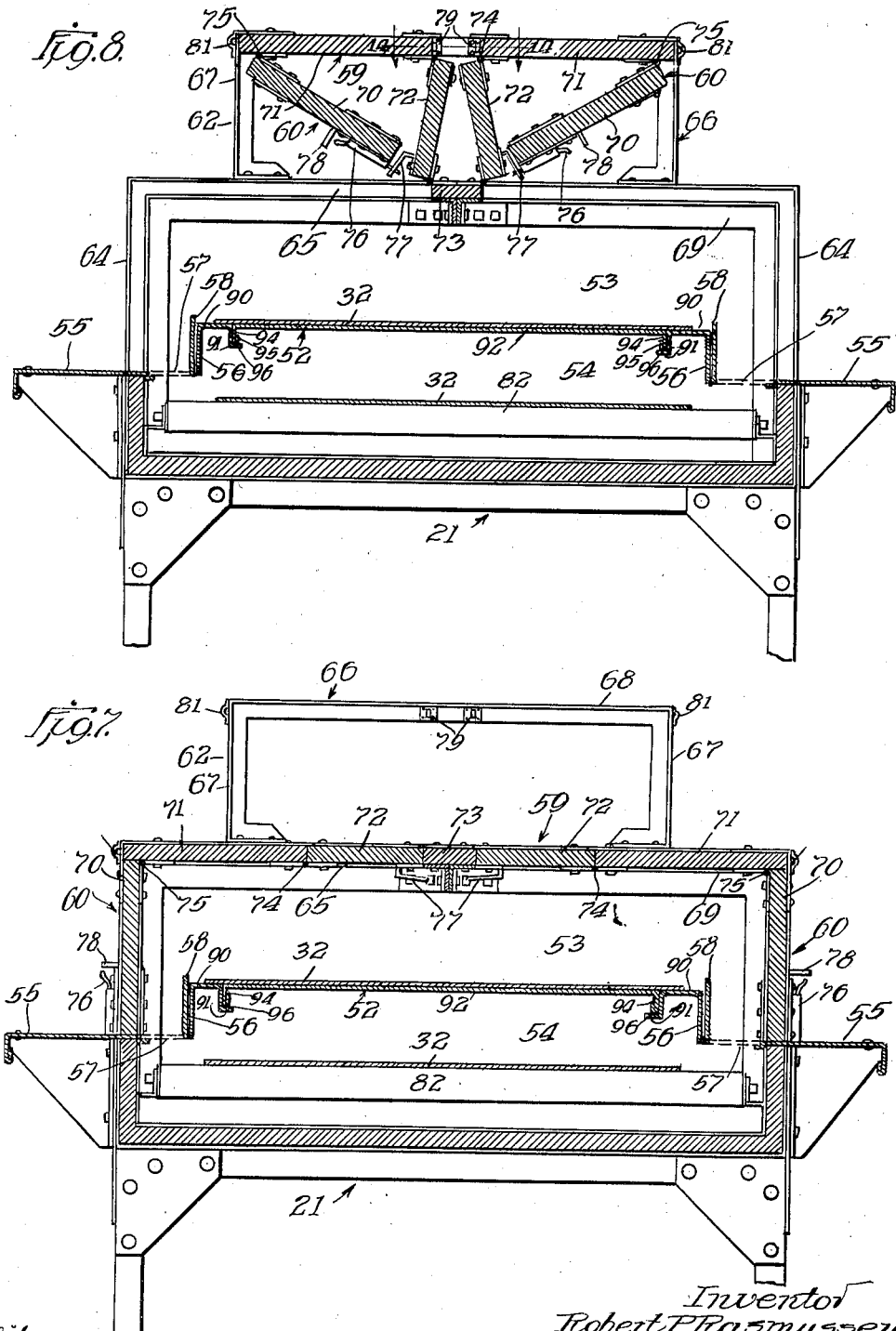

2,088,610

UNITED STATES PATENT OFFICE 2,088,610

MEANS FOR COOLING AND PACKING FOOD PRODUCTS

Robert P. Rasmussen, Chicago, Ill., assignor, by direct and mesne assignments, of three-eighths to Edvald L. Rasmussen, Washington, D. C.

Application June 13, 1932, Serial No. 616,973

12 Claims. (Cl. 34—12)

This invention relates to improvements in means for cooling and packing food products in the process of manufacture and particularly chocolate coated candies and other goods, such as cookies, etc.

The object of the invention is to provide means for the purpose mentioned which will result in a better product than heretofore, which will reduce the cost and increase the rate of production.

One important feature of the invention resides in the provision of an extension on the delivery end of the apparatus so made and constructed that it can be used as a packing table or can be converted into an extension of the tunnel, the arrangement being such that when the extension is used as an addition to the cooling tunnel, the air circulates through the extension with the result that the conveyor can be speeded up, thus increasing the output.

At times when the extension is arranged as a packing table, the parts which make a closed extension of the tunnel are folded back and provide a convenient shelf above the conveyor.

Another important feature resides in the novel means which I have provided to prevent any substantial intake of free air at either end of the tunnel. This is of importance as the surrounding atmosphere is usually heavily laden with moisture and is a detriment if taken into the system.

Another feature relates to the return of a portion of the air into the supply after it has passed through the apparatus. As practically no moisture is added to the air in the apparatus and as the air is heated, its humidity is decreased and this relatively dry air added to the cooler incoming air reduces its humidity and results in better products and more rapid and efficient cooling.

At times and for some products, it is desirable to first direct the air into contact with the products and afterward beneath the conveyor by which the products are carried through the tunnel, and by means of the improved apparatus, the air can be readily directed through the machine in one direction or another as may be best for the particular product being cooled.

Another feature relates to the provision of means for adjusting the speed or rate of flow of the air over the products and includes adjustable baffles by which the speed of the air can be changed but which also tends to cause a turbulence in the flowing stream which is effective to cause all parts thereof to be brought into direct contact with the goods. This results in increased efficiency and economy.

The apparatus includes as a feature of value, a metallic floor or horizontal partition which supports the conveyor as it passes through the tunnel. This floor which may be made of aluminum, assists in quickly extracting the heat from the bottom of the products carried by the conveyor and the cooling air flowing below this floor extracts the heat from it.

The floor or partition over which the conveyor passes is made removable in sections to facilitate inspection of the tunnel and the care of same.

In addition, in some instances I have found it advantageous to provide an extended heat radiation surface beneath the metal floor to assist in keeping the floor cool.

One feature of value is large doors arranged in the end walls of the tunnel to give access to the tunnel and small adjustable hinged closures carried by the lower edges of the doors to facilitate adjusting the end slots to minimum dimensions relative to the height of the goods on the conveyor belt.

Many other advantageous features will become apparent from the following description taken in conjunction with the appended claims and the accompanying drawings forming part of this specification and in which:—

Figs. 1 and 1ª constitute a fragmentary plan view of an improved apparatus which I have found best adapted for practicing my improved method of cooling products;

Figs. 2 and 2ª constitute a side elevation of the apparatus shown in Figs. 1 and 1ª;

Figs. 3, 3ª and 3ᵇ constitute a fragmentary, vertical, longitudinal, central section of the apparatus on the line 3—3 of Fig. 1 and 3ª—3ª, 3ᵇ—3ᵇ of Fig. 1ª.;

Figs. 4, 4ª and 4ᵇ constitute a fragmentary, horizontal, longitudinal section on the lines 4—4 of Fig. 3, 4ª—4ª of Fig. 3ª and 4ᵇ—4ᵇ of Fig. 3ᵇ;

Fig. 5 is a transverse, vertical section taken on the line 5—5 of Fig. 3ª;

Fig. 6 is a transverse, vertical section taken on the line 6—6 of Fig. 3;

Fig. 7 is a transverse, vertical section through the extension and taken on the line 7—7 of Fig. 3ᵇ, and showing the extension closed for making the extension a part of the cooling tunnel;

Fig. 8 is a view similar to Fig. 7 but showing the extension open for use as a packing table;

Fig. 9 is an outer end view of the extension;

Fig. 10 is a fragmentary, plan view of a portion of the cooling tunnel showing the means for adjusting the baffles in the tunnel;

Fig. 11 is a fragmentary side elevation of the extension to show the movable walls secured in closed position;

Fig. 12 is a view similar to Fig. 11 showing the walls secured in open position;

Fig. 13 is a fragmentary, vertical section on the line 13—13 of Fig. 4b;

Fig. 14 is a fragmentary, horizontal section on the line 14—14 of Fig. 8; and

Fig. 15 is a fragmentary, vertical section on the line 15—15 of Fig. 14.

In said drawings, 20 illustrates the tunnel and 21 the extension. The tunnel is provided at substantially the middle of its length with means for directing air through the tunnel and which includes an air supply pipe 22 and air exhaust pipe 23 and a by-pass 24 connecting these two pipes.

The tunnel 20 is provided with a box-like extension 25 at its middle portion to which the pipes 22 and 23 are connected. Within the box 25 are two pairs of movable valves 26 for controlling the direction of flow of the cooling air through the tunnel, one pair for the inlet and one pair for the exhaust. The by-pass 24 is for the purpose of directing a portion of the exhaust air back into the pipe 22 for mixture with the incoming air and for this purpose a power operated fan 27 is arranged in the by-pass and the by-pass is provided with a shut-off valve 28.

The tunnel 20 is a long rectangular tube divided into an upper part 29 and a lower part 30 by a horizontal partition 31. The partition 31 also serves as a support for a flat belt conveyor 32 which extends through the tunnel from end to end and serves to carry the goods, such as coated chocolate candies, cookies, etc., through the tunnel.

The conveyor belt 32 lies flat on the partition 31 and is moved along on same by any suitable means such as a drive belt 33 which drives a roller 34 around which the conveyor belt 33 is trained. The conveyor belt 32 is endless and returns through the lower part 30 of the tunnel, being trained around a suitable roller 35 at the opposite end of the apparatus.

While the apparatus is in operation, the tunnel is closed but is provided in its side walls with suitable openings for giving access to the interior.

The tunnel 20, as best shown in Figs. 4 and 4b, is somewhat wider than the conveyor belt 33, thus providing spaces beyond the edges of the conveyor belt for the provision of by-pass openings to direct the cooling air from one portion of the tunnel to the other portion, that is, from above the horizontal dividing partition 31 to below said partition, or vice versa as the case may be.

At the middle of the length of the tunnel and at each side of the conveyor belt 32 there is provided a by-pass opening, as shown at 36 at one side and 37 at the opposite side, and these by-passes can be cut off from communication with the upper chamber 29, as best shown in Fig. 5, by inclined walls 38 and the valves 26 when the valves are positioned as shown in Fig. 5 in full lines.

The valves 26 which are flat, are mounted at their lower edges on horizontal shafts 39 which project out at one end of the valve box 25 and are provided with handles 40 for operation.

The by-passes lead upwardly into triangular spaces defined on their inner sides by the inclined walls 38 and transverse walls 41 close off the ends of these spaces from the upper chamber 29 of the tunnel.

One pair of air valves 26 are arranged to close the passage to the upper chamber formed by the inclined walls 38 when the valves are swung inwardly, as shown in dotted lines, to open the by-passes 36 and 37 to the inlet. At such time, the incoming air passes directly from the inlet through the by-passes 36 and 37 to the lower compartment 30 of the tunnel, that is, beneath the horizontal partition 31.

Whether the air enters above the conveyor 32 or below it, it flows towards both ends of the tunnel and at each end by-passes similar to the by-passes 36 and 37 are provided to direct the air to the opposite side of the dividing partition 31. These by-passes at the end opposite to the extension 21 are shown at 42, Fig. 4, and comprise elongated openings through the edge portions of the partition 31. These by-passes are partly cut off from the upper chamber by vertical walls 43 which have the function in combination with a downwardly and inwardly inclined baffle plate 44 arranged within this end of the upper chamber 29, to prevent the escape of the circulating air at the end of the tunnel and direct it back through the opposite chamber of the tunnel either above or below as the case may be. This end of the tunnel is closed by a vertical end member 45 at the lower edge of which is a narrow section 46 hinged to the main door by friction hinges and the lower edge of which is spaced above the conveyor belt 32 to provide a slot or opening 47 high enough to permit the pieces carried by the belt to pass out.

If higher pieces than can pass through the slot 47 are being treated, the hinged section 46 may be swung up to increase the height of the slot 47. Preferably, the inclined baffle 44 which reaches from one side wall 43 to the opposite one is mounted on a horizontal shaft 48 which projects at one end through a side wall of the tunnel and is provided on its outer end with an operating handle 49 for setting the baffle 44 at different angles to suit the conditions of operation.

At the opposite end of the tunnel, as best shown in Fig. 3a, a similar construction is provided except that as shown in said figure and in Fig. 3b the end wall 50 at this end is hinged at its upper edge and is adapted at times to be swung up to horizontal position, as shown in full lines, to open this end of the upper part 29 of the tunnel to let the air pass through when the extension is arranged to serve as a part of the cooling tunnel. When the extension 21 is used as a packing table, the end wall 50 is swung down to close the tunnel, as shown in dotted lines, Fig. 3b. Likewise, when the end wall 50 is swung up to open the end of the tunnel, the deflector 44 is likewise swung up to open position as shown in full lines, and when the end wall is swung down to closed position, the deflector 44 is likewise swung down as shown in dotted lines.

This end of the tunnel is also provided with the by-passes 42, as shown in 4a, and also with means for closing these by-passes when the extension is closed for use as an extension of the tunnel for cooling purposes. These by-pass closures consist of closure plates 51 arranged to swing up against the vertical walls 43 to open the by-passes and are shown in closed positions in Fig. 4a in full lines and in open positions in dotted lines.

When the extension 21 is closed for cooling purposes, the by-passes 42 at this end of the tunnel are closed by the closure plates 51 and when the extension is opened for use as a packing table and the end wall 50 is swung down, these by-passes are opened.

The extension 21 is built similarly to the main part 20 of the apparatus, that is, it has a horizontal floor 52 similar to the floor 31 of the main part and arranged as an extension thereof and over and in contact with which the conveyor belt 32 is moved. This floor 52 extends from end to end of the extension 21 and is slightly wider than the conveyor belt 32.

When the extension 21 is closed, as best shown in Fig. 7, there is provided an upper compartment 53 above the floor 52 and similar to and an extension of the upper compartment 29 of the main part 20 and a lower compartment 54 similar to and an extension of the lower compartment 30 of the main part 20. The conveyor belt 32, as shown in Figs. 7 and 8, extends through both of these compartments.

At each side of the extension 21 and extending the full length of the extension are horizontal shelves 55. These shelves are arranged at a suitable height for use by packers, standing on the floor alongside the extension, as packing shelves. At such times the extension is opened up to expose the conveyor belt 32 so that the packers can readily lift the articles from the belt and pack them in boxes.

The shelves 55 as shown are somewhat lower than the floor 52 and the spaces between the shelves and the floor are closed by vertically extending walls 56.

For the purpose of returning the circulating air from the outer end of the extension when the extension is closed to serve as a cooler, are by-passes 57, as shown in Fig. 4b, at the outer end of the extension parts 58 of the shelves 55 being made movable for this purpose. These movable parts are adapted to be swung up to vertical position, as shown in full lines, Figs. 7 and 8, when the extension is closed, to let the air pass back through the tunnel and to be swung down to horizontal position to form parts of the shelves 55 when the extension is opened for use as a packing table, as shown in dotted lines in Figs. 7 and 8.

The upper compartment 53 of the extension has a top wall 59 and side walls 60 and these walls are divided longitudinally into sections of convenient length for swinging up and down by hand, usually they are about eight feet long. Between the sections and at the ends of the extension are upstanding angle iron frames 61, 62 and 63. The frame 61 is at the outer end of the extension, the frames 62 are between adjacent sections and the frame 63 is at the juncture of the extension 21 with the main tunnel 20. These frames each comprise a vertically extending side post 64 which extends up from the base of the machine through the shelves 55 in the planes of the side walls 60 and to the height of the top wall 59. The top of the posts 64 are joined by a horizontal member 65. Rising above the top member and secured rigidly thereto is a smaller part 66 of the frame, rectangular in shape and consisting of side posts 67 and a top bar 68 rigid therewith. The lower main part of the frames have outwardly extending flanges 69 against which the adjacent ends of the sections of the walls and top close when the extension is closed.

The upper parts 66 of the frames are narrower than the flanges of the lower part to let the parts of the walls pass same when being opened up for the purpose of using the extension as a packing table.

The end frames 61 and 63 are similar to the intermediate frames except that the closing flanges appear only on their inner sides.

The side walls and tops of the sections of the extension are divided along the central longitudinal line into two similar sides, each consisting of a wall member 70 and two top members 71 and 72.

Each inner top part 72 is hinged at its inner edge to a central fixed bar 73 to swing up as shown in Fig. 8. Each outer top part 71 is hinged at its inner edge to the outer edge of its adjacent inner part 72 by hinges 74 to swing downwardly in relation to the inner part 72 as same swings up and the opposite parts 71 when the parts are swung up as shown in Fig. 8 together form a shelf for use in packing and at the height of the top bar 68 of the upper frame.

The side wall part 70 is hinged at its upper edge to the outer edge of the outer top part 71 by hinges 75 to swing inwardly as the other parts are swung up, to an inwardly and downwardly inclined position as shown in Fig. 8 beneath the part 71, means being provided for securing the several parts rigidly in both open and closed positions.

This securing means includes sliding bolts 76 on the lower edges of the outer faces of the side walls adapted to be pushed down through holes in the shelves 55 to hold the walls in closed position and adapted when the walls are folded up to be projected into openings provided in metal projections 77 secured to the undersides of the inner top members 71, as best shown in Fig. 8. The sections of the walls of the extension are provided with suitable handles 78 for convenience in moving them.

When the extension is opened, the inner edges of the members 71 of the top wall contact with rigid stops 79 arranged on the upper frame bar 68 of the upper frame 66 and these parts 71 carry sliding bolts 80 on their outer edges adapted to be engaged in openings formed by strap members 81 provided on the outer ends of the top frame 66 when the extension is closed.

Anti-friction rollers 82 may be provided at various places to support the endless conveyor belt 32. The construction of the outer end of the extension is similar to that of the main tunnel in that an end door 83 is provided and a narrow hinged part 84 is provided at its lower edge for convenience in adjusting the exit slot to its smallest height in relation to the articles being cooled.

When the extension is used as a packing table, the extension is open and the packers remove the articles carried by the conveyor reaching in from the sides of the extension. When the extension is used as part of the cooling tunnel, the extension is closed and the conveyor carries the goods out through the end slot and suitable means is provided for dumping the goods into containers as the conveyor is directed down and back through the lower part of the tunnel.

In the upper part 29 of the tunnel I arrange adjustable deflectors 85. These extend from side to side of the tunnel and hang down from shafts 86 which extend out through one side of the tunnel. These deflectors can be set at different angles and their lower edges at different distances from the conveyor belt. For this purpose the shafts 86 upon which the deflectors are secured are connected by operating link chains 87 and a crank handle 88 is provided, secured to one of the shafts 86 by which all of the deflectors in a series can be adjusted simultaneously. When the deflectors are set vertically, the space beneath them will be the smallest and the rate of flow of air will be the fastest. Another function of the deflectors is to serve as turbulators to cause the air as it flows to be mixed and thereby destroy stratification of the air current and cause all portions of the air to be brought into contact with the goods carried by the conveyor. This greatly assists the cooling action and is an economical feature.

The metal floor 52 beneath the active portion of the conveyor serves to extract the heat from the bottoms of the pieces carried by the belt and for the purpose of enhancing this effect, metallic heat radiating fins 89 are secured to the underside of the floor 52. Preferably, these fins 89 extend longitudinally of the tunnel so that they do not offer any appreciable resistance to the flow of air through the lower compartment 30 of the tunnel.

The horizontal partition or floor of the tunnel is preferably made up of rigid side parts 90 provided at their inner edges with depressed horizontal and inwardly extending ledges 91, which serve to support the main central part 92 of the floor. This main central part 92 upon which the conveyor belt rests is made up of sections 93, see Fig. 3, the side edges 94 of which, as best shown in Fig. 13, are bent downwardly, the extreme edges 95 being turned back upwardly again to provide a definite supporting edge 96 for contact with the ledges 91. The edge construction of the sections 93 serve to stiffen the sections and hold them flat. These sections are removable from their positions by lifting them up off of the ledges 91 and tipping them slightly to pass between the ledges. It is a great convenience in caring for the apparatus to have the main part of the floor of the tunnel readily removable.

It will now be clear that the cooling air can be directed from the inlet at the middle of the tunnel through the upper compartment 29 towards both ends of the tunnel and that it will flow back from both ends to the exhaust or exit, or that the incoming air can be directed to the lower compartment 30 of the tunnel at the middle of the tunnel, when it will flow through the lower compartment towards both ends and back from both ends through the upper compartment 29 to the exit at the middle.

In both of these ways of applying the air, the air impinges on the goods carried by the conveyor belt first against one side as the goods pass from the entering end toward the middle and then against the opposite side as the goods pass from the middle of the tunnel to the delivery end. This alternate action of the air is important especially in the cooling of chocolate coated goods as it tends to evenly cool the pieces and thus eliminate light or discolored spots which are caused by uneven cooling as when the air strikes always against one side of the goods.

In the operation of the apparatus in the cooling of chocolates, it is preferable to first send the cooling air through the lower compartment 30 of the tunnel to both ends, thus quickly cooling the bottoms of the chocolates and causing them to quickly set. In this step, the cooling air is heated to some extent, and its humidity is decreased, and in this condition it is best suited for direct contact with the chocolates on its return through the upper part 29 of the tunnel. Further, as the air is directed toward the middle of the tunnel as it rises through the return by-passes at the ends of the tunnel, the tendency to escape through the belt slots at the ends of the tunnel is decreased.

In using the valves 26 for directing the flow of air through the tunnel, it will be clear that when one pair is arranged as shown in full lines, Fig. 5, for communication with the upper compartment 29, the other pair are arranged as shown in dotted lines for communication with the lower compartment through the by-passes 36 and 37.

As many modifications of the novel method and the apparatus will suggest themselves to one skilled in the art, the invention is not limited to the specific sequence of steps or the specific details of construction and arrangement of devices and parts herein shown and described, such being merely typical of the improvements.

I claim:

1. In an apparatus of the kind described, a cooling tunnel, means for causing a flow of air through the tunnel, a conveyor belt passing through the tunnel, the side walls and top wall of an end of the tunnel composed at each side of longitudinally extending sections, hinged together and to the middle of the top wall, and each side portion thereof arranged and adapted to be folded together above the top wall of the tunnel for packing purposes, and to be unfolded and swung down to close the extension for cooling purposes and latch means for holding the sections in either open or closed position.

2. The invention as defined in claim 1, and means arranged and adapted to cause the flow of air through the tunnel to be extended through the extension when the walls are closed.

3. The improvements herein described and comprising a cooling tunnel for chocolates and the like, a conveyor belt for carrying the goods through the tunnel, means for causing a flow of cooling air through the tunnel, an extension at the delivery end of the tunnel through which the conveyor belt extends, the side walls and the top wall of the extension at each side being composed of longitudinally extending sections hinged together and to the center of the top wall and arranged and adapted to be folded together above the tunnel to expose the conveyor for packing purposes, and at other times to be unfolded and swung down to enclose the conveyor, and latch means for holding the sections in either open or closed position.

4. The invention as defined in claim 3, and means for directing the cooling air back to the main tunnel from the extension thereof.

5. In an apparatus of the kind described, a cooling tunnel having an upper compartment through which a conveyor belt moves to carry goods through the tunnel, and a lower compartment for circulation of air therethrough, means for causing a flow of cooling air through the upper compartment in one direction and a flow of the air in the lower compartment in the opposite direction, by-pass passages at the end of the tunnel to permit the passage of the air from one compartment to the other, an extension for the apparatus convertible from an extension to the tunnel to a packing table, valves for closing said by-passes when the extension is used as an extension to the tunnel to cause the air to likewise flow through the extension, and by-passes at the outer end of the extension to permit the air to pass from one compartment to the other.

6. The improvements herein described and including a cooling tunnel, a conveyor belt movable through the tunnel for carrying material such as pieces of candy, to be cooled, means for causing cooling air to flow through the tunnel above the conveyor in one direction and return beneath the conveyor in the opposite direction, the conveyor extending a distance beyond an end of the tunnel, means for enclosing the extension of the belt to serve as an extension of the tunnel, means for causing the cooling air to flow through the closed extension and return therefrom to the tunnel, such closure means having hinged sides and tops adapted to be easily positioned to expose the extension of the belt or to enclose same.

7. The combination with a tunnel of the kind described, of an extension at one end, the tunnel and extension divided into an upper and a lower compartment, means for causing a flow of air from the middle of the tunnel towards the ends in one compartment, by-passes at the ends of the tunnel connecting the two compartments for directing the air back through the opposite compartment, similar by-passes at the outer end of the extension, the extension being arranged and adapted to be closed at times to serve as an extension of the tunnel and to be opened at times to serve as a packing table, means for closing the by-passes at the ends of the extension when the extension is opened, and means for closing the by-passes at the end of the tunnel adjacent to the extension when the extension is closed.

8. In an apparatus of the kind described, a cooling tunnel and a convertible tunnel extension and packing table at one end thereof, a conveyor belt arranged to pass through both the tunnel and extension, the extension having side walls above the belt and a top made in sections and the sections at each side hinged together, and to the center of the top wall, whereby they are adapted to be folded up above the belt to open the extension for packing purposes and to be closed down over the belt for using the extension as an addition to the main tunnel and latch means for holding the sections in either tunnel open or closed position.

9. The invention as defined in claim 8, the extension provided with a packing shelf at each side, the shelf provided with openings at the outer end of the extension to permit air to pass when the extension is closed and movable plates adapted to close said openings and to serve as parts of the shelves when the extension is open.

10. In an apparatus of the kind described, a tunnel through which articles are adapted to be conveyed, said tunnel having an end portion, a conveyor for carrying articles through said tunnel and said end portion, a cover for said end portion, said cover having top and side walls secured together and enclosing said end portion for use of said end portion as part of the tunnel when said cover is in closed position, said cover being adapted to be raised while the top and side walls are secured together to withdraw said side walls from their closed position to open said end portion and expose the conveyor in said end portion to serve as a packing table, means for causing a flow of air through said tunnel and said end portion, and means for stopping the flow of air through said end portion when said end portion is open.

11. In an apparatus of the kind described, a tunnel through which articles are adapted to be conveyed, said tunnel comprising a frame, an end portion and a cover for said end portion, said cover being secured to said frame and having top and side walls enclosing said tunnel end portion when said cover is in closed position, said cover being adapted to be raised while still secured to said frame to withdraw said side walls from their closed position to open said end portion of the tunnel, and means for causing a flow of air through the tunnel.

12. In an apparatus of the kind described, a tunnel through which articles are adapted to be conveyed for action thereon of a flow of air, said tunnel comprising a frame, an end portion and a cover for said end portion, said cover being secured to said frame and having top and side walls enclosing said end portion when said cover is in closed position, a conveyor passing through said tunnel and said end portion, said cover being adapted to be raised while still secured to said frame to withdraw said side walls to open said end portion to expose said conveyor in said end portion to serve as a packing table, and means for causing a flow of air through said end portion when said cover is in closed position and for stopping the flow of air through said end portion when said end portion is open.

ROBERT P. RASMUSSEN.